United States Patent
Drako et al.

(10) Patent No.: US 10,442,310 B1
(45) Date of Patent: Oct. 15, 2019

(54) VEHICLE YAW AND ENERGY EFFICIENCY CONTROL APPARATUS TO DYNAMICALLY ASSIGN TORQUE AMONG INDEPENDENTLY POWERED DRIVE WHEELS

(71) Applicants: Dean Drako, Austin, TX (US);
Shivinder Singh Sikand, Santa Cruz, CA (US)

(72) Inventors: Dean Drako, Austin, TX (US);
Shivinder Singh Sikand, Santa Cruz, CA (US)

(*) Notice: Subject to any disclaimer, the term of this patent is extended or adjusted under 35 U.S.C. 154(b) by 0 days.

(21) Appl. No.: 14/634,782

(22) Filed: Feb. 28, 2015

Related U.S. Application Data

(60) Provisional application No. 61/950,229, filed on Mar. 10, 2014.

(51) Int. Cl.
  *B60L 15/20* (2006.01)
  *B60L 15/36* (2006.01)
  *B60L 3/10* (2006.01)

(52) U.S. Cl.
  CPC ........... *B60L 15/2036* (2013.01); *B60L 3/106* (2013.01); *B60L 15/36* (2013.01)

(58) Field of Classification Search
  CPC ...... B60L 15/2036; B60L 15/36; B60L 3/106; B60L 3/102; B60L 2240/22; B60L 2240/423; B60L 2260/28; B60K 7/0007; Y02T 10/649
  See application file for complete search history.

(56) References Cited

U.S. PATENT DOCUMENTS

| | | | | |
|---|---|---|---|---|
| 5,376,868 A * | 12/1994 | Toyoda | ..................... | B60L 3/00 318/52 |
| 5,465,806 A * | 11/1995 | Higasa | ................. | B60K 7/0007 180/165 |
| 7,386,379 B2 * | 6/2008 | Naik | .................... | B60K 17/356 180/6.5 |
| 2011/0288707 A1 * | 11/2011 | Westlake | ............. | B60K 7/0007 701/22 |
| 2011/0307129 A1 * | 12/2011 | Yu | ....................... | B60K 7/0007 701/22 |

(Continued)

FOREIGN PATENT DOCUMENTS

JP  10-295004  * 11/1998

*Primary Examiner* — Michael J Zanelli
(74) *Attorney, Agent, or Firm* — Patentry; Peter G.H. Hwang

(57) ABSTRACT

A circuit budgets torque among independent field-oriented motor control circuits. A desired vehicle yaw turning moment is received from an operator control input. The circuit determines a positive or negative torque target for each electrically powered drive wheel and transmits it to an adaptive field-oriented motor control circuit which provides voltage magnitude and voltage frequency to a poly-phase synchronous alternating current electric motor. When wheel loading, limited traction, or stability prevents any motor from attaining the torque target, that data is returned to the budgeting circuit and torque budget is adjusted for all adaptive field-oriented motor control circuits. Varying numbers of powered wheels are assigned torque depending on vehicle dynamics. Performance of the vehicle can be adapted to driver capabilities. A vehicle may serve as a driving simulator for diverse vehicles.

2 Claims, 3 Drawing Sheets

(56) References Cited

U.S. PATENT DOCUMENTS

| | | | |
|---|---|---|---|
| 2012/0109483 A1* | 5/2012 | O'Dea | B60T 8/1755 701/71 |
| 2014/0046568 A1* | 2/2014 | Kato | B60L 9/18 701/84 |
| 2014/0200789 A1* | 7/2014 | Pietron | B60W 50/085 701/96 |

* cited by examiner

VEHICLE YAW AND ENERGY EFFICIENCY CONTROL APPARATUS TO DYNAMICALLY ASSIGN TORQUE AMONG INDEPENDENTLY POWERED DRIVE WHEELS

CROSS-REFERENCES TO RELATED APPLICATIONS

This non-provisional application benefits from its provisional application No. 61/950,229 filed on Mar. 10, 2014 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The field of the invention is control signals for an electric vehicle directional and power control system: electronic differentials, torque vectoring, poly-phase electric motors.

Description of the Related Art

It is known that torque vectoring is provided to all wheel drive vehicles.

Torque vectoring is a known technology employed in automobile differentials. A differential transfers engine torque to the wheels. Torque vectoring technology provides the differential with the ability to vary the power from one wheel to another. This method of power transfer has recently become popular in all-wheel drive vehicles. Some newer front-wheel drive vehicles also have a basic torque vectoring differential. As technology in the automotive industry improves, more vehicles are equipped with torque vectoring differentials.

Differentials are known to refer to a particular type of simple planetary gear train that has the property that the angular velocity of its carrier is the average of the angular velocities of its sun and annular gears. This is accomplished by packaging the gear train so it has a fixed carrier train ratio $R=-1$, which means the gears corresponding to the sun and annular gears are the same size. This can be done by engaging the planet gears of two identical and coaxial epicyclic gear trains to form a spur gear differential. Another approach is to use bevel gears for the sun and annular gears and a bevel gear as the planet, which is known as a bevel gear differential.

The fundamental concept of torque vectoring depends on the principles of a standard differential. A differential shares available torque between wheels. This torque sharing ability improves handling and traction. Torque vectoring differentials were originally used in racing. The technology has slowly developed and is now being implemented in a small variety of production vehicles. The most common use of torque vectoring in automobiles today is in all-wheel drive vehicles.

The main goal of torque vectoring is to vary a share of torque between or among wheels coupled to a motor or engine. Differentials generally consist of only mechanical components. A torque vectoring differential often includes an electronic monitoring system in addition to standard mechanical components. This electronic aspect is only to direct the mechanical differential when and how to share the torque.

Torque vectoring differentials on front or rear wheel drive vehicles are less complex than all-wheel drive differentials. The two wheel differential only shares torque between two wheels.

A front-wheel drive differential must take into account several factors. It must monitor rotational and steering angle of the wheels. As these factors vary during driving, different forces are exerted on the wheels. The differential monitors these forces, and adjusts torque accordingly. Many front-wheel drive differentials can increase or decrease torque transmitted to a certain wheel by changing the ratio between the two wheels. This ability improves a vehicle's capability to maintain traction in poor weather conditions. When one wheel begins to slip, the differential can reduce the torque to that wheel, effectively braking the wheel. The differential also increases torque to the opposite wheel, helping balance the power output and keep the vehicle stable. A rear-wheel drive torque vectoring differential works the same way as a front-wheel drive differential, but doesn't monitor the steering angle.

Most mechanical torque vectoring differentials are on all-wheel drive vehicles. A first torque vectoring differential varies torque between the front and rear wheels. This means that under normal driving conditions, the front wheels receive a set percentage of the engine torque, and the rear wheels receive the rest. If needed, the differential can transfer torque between the front and rear wheels to improve vehicle performance. This is a zero sum game.

For example, a vehicle might have a standard torque distribution of 90% to the front wheels and 10% to the rear. Under harsh conditions, the differential changes the distribution to 50/50. This new distribution spreads the torque more evenly between all four wheels. Having more even torque distribution increases the vehicle's traction.

There are more advanced torque vectoring differentials as well. These differentials build on basic torque transfer between front and rear wheels. They add the capability to share torque between a pair of front wheels or between a pair of rear wheels.

The differential monitors each wheel independently, and distributes available torque to match current conditions. One known mechanism first allocates available power between front and rear pairs and subsequently shares the amount of torque transmitted to each rear wheel by a second differential in series. The front wheels, however, do not receive different amounts of torque. Another known torque vectoring system adds a third mechanical differential to share torque provided to the front pair of wheels.

Another known system supports 4 electric motors coupled by gearboxes and axles to individual wheels. Negative torque is produced electrically rather than applying brakes as mechanical systems do.

As is known, Mercedes Benz has provided a purpose built electric vehicle with four synchronous independent electric motors. The engines make a total of 740 (750 PS) and 1,000 Nm (737.5 lb-ft), which is split equally among the four wheels in normal driving conditions. Because all four motors are electrically-powered independently of one another this potentially offers higher speed wheel control.

The conventional Mercedes approaches are still mechanically linking each motor to its wheel by a reduction gearbox and axle. A production Tesla utilizes a single 3 phase AC induction motor and has a conventional mechanical power train. A conventional mechanical power train provides three differentials and reduction gearboxes. A conventional power train must have the same reduction ratio from a single engine to the front axis as well as to the rear axis to enable all wheel drive. A dual motor system may have two reduction ratios.

It is known that torque vectoring is particularly suited to electric vehicles. Lotus has been evaluating and developing new systems and approaches. When a driver turns the steering wheel, he or she expects the vehicle to change direction (yaw). The vehicle does not, however, respond immediately because tires take time to build up lateral forces, and the actual vehicle response may not be exactly what is desired.

Particularly at high vehicle speed, after an initial delay period (a fraction of a second) the vehicle yaw rate can overshoot and oscillate before settling on a steady value. At very high speeds, or if the vehicle's suspension is poorly tuned or the operator poorly skilled, the oscillations can increase and the vehicle can go out of control. Even at lower speeds, the oscillations can make the vehicle feel less stable and the driver may need to successfully make multiple steering adjustments to follow the intended path.

Conventional vehicle suspension is tuned through bump steer, static settings, etc., to minimize the oscillations and to give a stable response at all vehicle speeds and loading conditions, but any increase in stability is at the expense of vehicle agility and the vehicle response can become disappointing.

It is known that when a vehicle has independent control over the drive and braking torques to each wheel (for instance, electric hub motors), there is an opportunity to improve the vehicle yaw response.

One approach has been by increasing the drive torque to a pair of tandem wheels (e.g. port), and creating an effective braking torque at the opposite pair of tandem wheels (e.g. starboard). These drive torques are in addition (or subtracted from) to the normal drive torques required to control vehicle speed. In other words, turning or yaw occurs when one side of a car is traveling faster than the other side.

Maximum Yaw Turning Moment (Torque)

Independent of the steered angle of the wheels, a yaw moment is generated when the resultant vector of the tire forces is perpendicular to a line through the center of gravity. The resultant force is the vector sum of lateral force and driving/braking force. The maximum yaw moment (if required) is obtained when the resultant of the tire forces is perpendicular to a line from the center of the tire to the vehicle center of gravity.

There are two main advantages in using these resultant forces to control vehicle yaw (as opposed to purely tire lateral forces):

The resultant force can act at a greater lever arm, increasing the maximum moment available.

Yaw rate can be controlled without requiring multiple steering adjustments.

If the forces are correctly controlled, the vehicle can be made to respond more quickly to a steering input and instability can be reduced.

To do this, the control of the wheel torques needs to consider:

Increasing torque on the one side must be balanced by a reduction on the other side to avoid unnecessary acceleration.

Vertical load on each wheel—particularly as the vehicle corners, the vertical load on the inner wheels reduce and drive/braking torque may cause wheel spin or wheel lock-up.

The addition of drive or braking torques at the rear may result in loss of rear grip—leading to loss of control.

Any response must be safe and predictable.

Therefore, simply distributing the torque based on steering wheel angle would achieve more yaw response (for the same steering input), but it may not create any improvement in stability. It could even make the vehicle behavior less predictable.

One known approach is yaw rate feedback. For any steer angle and forward velocity, an ideal yaw rate can be calculated by assuming no tire slip, and using the wheel geometry to approximate the turn radius. The measured yaw rate is then used as feedback, giving a yaw error. A differential term (yaw acceleration) is included for damping. The output is used to control the distribution of drive torque; i.e. for a left turn, an additional torque is applied to the right, with an equal braking torque applied to the left. These torques are in addition to the 'normal' drive torque that maintains the vehicle forward velocity.

A limitation to conventional feedback control is that the system relies on measured yaw rate as an input signal. This measured response data will also include 'noise' (high frequency waves created by road inputs and general vibration). In order to use the signal, the signal must be filtered. This unfortunately creates a time delay in the signal, and the feedback becomes too late creating overshoot and oscillations in the response.

Electric Motor or Traction Drive Controls

Transmitting Positive or Negative Values in Newton Meters.

It is known that Direct Torque Control is used in variable frequency drives to control the torque (and thus finally the speed) of three-phase AC electric motors. This involves calculating an estimate of the motor's magnetic flux and torque based on the measured voltage and current of the motor.

See patents by Depenbrock, Takahashi and Noguchi on direct self control and direct torque control.

U.S. Pat. No. 4,678,248 discloses a method for controlling a rotating-field machine supplied from an inverter, the output voltage system of the inverter being variable with respect to amplitude, phase and frequency includes supplying amplitudes of stator flux components formed from measured stator current components and stator voltage components as actual value of a flux control loop, and changing the phase and frequency of the inverter output voltage system with a flux control as a function of a predetermined stator flux reference value by directly setting-in the switching state of the inverter and an apparatus for carrying out the method.

It is known that Vector motor control or field-oriented control provides control over three-phase AC electric motors by adjusting the output current of a VFD inverter in Voltage magnitude and Frequency. FOC is a control technique that is used in AC synchronous and induction motor applications that was originally developed for high-performance motor applications which can operate smoothly over the full speed range, can generate full torque at zero speed, and is capable of fast acceleration and deceleration but that is becoming increasingly attractive for lower performance applications as well due to FOC's motor size, cost and power consumption reduction superiority. Not only is FOC very common in induction motor control applications due to its traditional superiority in high-performance applications, but the expectation is that it will eventually nearly universally displace single-variable scalar volts-per-Hertz (V/f) control.

What is needed is an improved apparatus and method to enable dynamic wheel control for yaw and energy control in electric vehicles by separately budgeting torque at each wheel.

BRIEF SUMMARY OF THE INVENTION

A system transforms operator intentions into electrical magnitudes and frequencies or phase angles.

A circuit budgets torque among independent field-oriented motor control circuits. A desired vehicle yaw turning moment is received from an operator control input. The circuit determines a positive or negative torque target for each wheel and transmits it to an adaptive torque control or field-oriented motor control circuit that provides voltage magnitude and voltage frequency to a poly-phase synchronous alternating current electric motor. When wheel loading, limited traction, or stability prevents any motor from attaining the torque target, that data is returned to the budgeting circuit and torque budget is adjusted for all adaptive field-oriented motor control circuits. When a requested torque is not attainable, the adaptive motor control circuit determines what is possible to avoid loss of traction and, in an embodiment, transmits it to a torque budgeting circuit. The torque budgeting circuit can readjust its target torque commands in consideration of attainable torque for each wheel, user operations (steering), and lateral acceleration and stability data. Vehicle characteristics and driver skill level are parameterized profiles which control the torque budgeting circuit and which can be updated by machine learning or downloaded files.

A plurality of adaptive motor control circuits provide variable frequency poly-phase (typically 3-phase) current and voltage to motors which individually drive one wheel each. Sensors, in an embodiment, locally attached to each wheel, provide slip and skid information directly to an adaptive torque control or an adaptive field-oriented control (AF-OC) circuit. In an embodiment, all adaptive torque control circuits receive an attainable torque message and self-adjust.

As is known, circuits as specified herein may be embodied in digital logic, programmable logic devices such as gate arrays and field programmable gate arrays, and computing devices such as microprocessors coupled to non-transitory stores of executable instructions.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
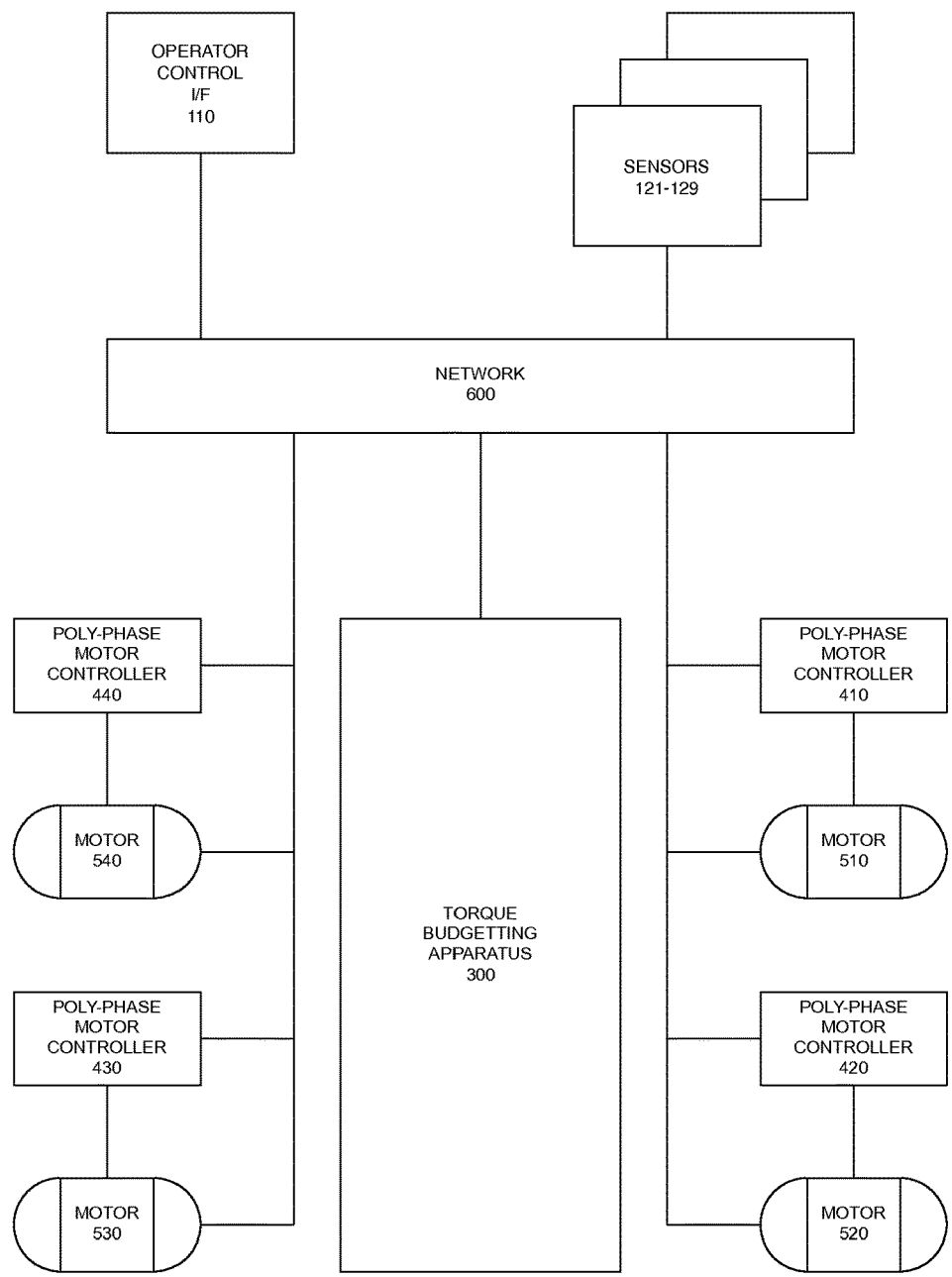
FIG. 1 is a block diagram of a system.

In these embodiments, computing devices once embedded in this real-time closed loop control system, lose their generic capability for executing instructions other than continuously responding to physical measurements of indicia by setting electrical magnitudes and frequencies.

A system is disclosed which includes a torque budgeting apparatus, at least four motor controllers each coupled to a powered wheel, sensors, an operator control unit, and a network coupling all the above components.

An apparatus is disclosed which has interfaces to receive measurements and indicia of operator desired control values, circuits to assign torque to at least one of the electric propulsion motor controllers, circuits to receive attainable torque from the motor controllers, and a torque budget transformation circuit. In an embodiment, a driver/vehicle personalization profile store is coupled to the torque budget transformation circuit.

One aspect of the invention is a method operable by a processor performing steps encoded as instructions on a non-transitory media, to control distribution of electric energy to at least one traction drive coupled to a wheel comprising: sensing the steering direction and speed of the vehicle; on the condition of speed below a threshold, distributing power to one or more wheels associated with only one axle and if turning to only one wheel of the only one axle; on the condition of speed above a threshold and when not turning, distributing power to wheels associated with only one axle; on the condition of aggressive cornering applying yaw controlled power to budget torque among at least four wheels; on the condition of inclement weather applying yaw controlled power to budget torque among at least four wheels; and on the condition of poor road conditions applying yaw controlled power to budget torque among at least four wheels.

The network communicates inputs such as measured yaw, vertical loading of each wheel, measured torque, wheel orientation, wheel speed, and tire slip. In an embodiment, the network distributes these inputs to each other wheel and to the yaw control apparatus.

The network communicates a desired torque value or a delta torque value for each traction drive and returns a confirmation or error message from each motor control circuit. Each traction drive may calculate parameters for its own motor configuration.

Drive parameters include a current, voltage, frequency, or phase for each wheel calculated by the yaw control apparatus. The drive parameters may be transmitted to each wheel if the wheel's control circuit does not calculate from the desired torque.

A digital yaw control apparatus is communicatively coupled to a user interface and to a network. The network connects at least one control drive for each wheeled electric motor and provides a digital torque packet to said control drive. The control drive provides current or voltage to the wheeled motor. The control drive modulates the amplitude of the current or voltage. The control drive modulates the frequency or phase of the current or voltage. The wheeled electric motor has a torque sensor and transmits the resulting torque back to the digital yaw control apparatus. An authentication circuit ensures that the correct wheeled motor receives the digital torque packet and that the packet was transmitted by the correct control drive.

In one embodiment for two wheel control, the invention controls torque at a left and at a right rear wheels or at a left and a right front wheel, which eliminates the needs for at least one mechanical differential gear or any electronically controlled differential. As a function of the steering angle, steering speed, throttle pedal position, yaw velocity and vehicle speed, the apparatus applying negative torque to the left or right wheel, as required.

In one embodiment, this means that when entering a corner at high speed, moderate negative torque values are transmitted to the inside rear wheel. Simultaneously positive drive torque values transmitted to the outside rear wheel supports the steering motion of the car.

One aspect of the invention is a system including a processor coupled to non-transitory computer readable media and communicatively coupled to an operator interface and communicatively coupled to one or more electrical powered propulsion apparatuses.

The system determines a difference between desired vehicle yaw and measured vehicle yaw to determine a value for delta torque for each propulsion apparatus.

The system determines a value for positive or negative desired torque for each of the one or more electrically powered propulsion apparatuses and transmits the desired target torque to each of the one or more electrically powered propulsion apparatuses.

In embodiments, the system transmits a value as a digital value; or in another embodiment as an amplitude; or in another embodiment as a phase angle or as a frequency. In embodiments the system determines and transmits the value as a complex number. In an embodiment, the system further has at least one yaw sensor. In an embodiment, the system further has at least one pitch sensor. In an embodiment, the system further has at least one roll sensor. In an embodiment, the system further has at least one acceleration sensor.

In one embodiment of the invention, an electrically powered propulsion apparatus has one or more wheels, one electric motor per wheel, a motor controller per wheel, and at least one sensor. The electrically powered propulsion apparatus further includes a surface sensor to report a vector of actual travel direction and speed. In an embodiment the system also has an edge of pavement sensor.

An apparatus receives measurements from a wheel speed sensor, wheel orientation, and operator control inputs on desired yaw turning moment, and desired vehicle acceleration. The apparatus determines torque assignment to each electrically powered drive wheel. A circuit determines when one or more wheels is in a spin or skid condition. A circuit determines when the vehicle is in a steady state or cruise condition. A circuit determines when the vehicle is in a slow speed turning condition. A circuit determines when the vehicle is in an aggressive cornering condition. A circuit determines how many and which wheels should be assigned a torque budget.

In some implementations, the method could utilize a highly customized digital or analog processor coupled to motor controllers to supply poly-phase electrical current or voltage.

In one embodiment, a processor performing steps encoded as instructions on a non-transitory media, to control distribution of electric energy to at least one traction drive coupled to a wheel would cause sensing the steering direction and speed of the vehicle; on the condition of speed below a threshold, distributing power to one or more wheels associated with only one axle and if turning to only one wheel of the only one axle; on the condition of speed above a threshold and when not turning, distributing power to wheels associated with only one axle; on the condition of aggressive cornering applying yaw controlled power to budget torque among at least four wheels; on the condition of inclement weather applying yaw controlled power to budget torque among at least four wheels; and on the condition of poor road conditions applying yaw controlled power to budget torque among at least four wheels.

In an embodiment, the apparatus further performs receiving, via a network communication interface, the following inputs measured yaw, vertical loading of each wheel, measured torque, wheel orientation, wheel speed, and tire slip.

In an embodiment, the apparatus further performs transmitting, via a network communication interface, measured yaw, vertical loading of each wheel, measured torque, wheel orientation, wheel speed, and tire slip to each other wheel.

In an embodiment, the apparatus further performs transmitting, via a network communication interface, a desired torque value or a delta torque value for each traction drive; and receiving a confirmation or error message from each motor control circuit.

In an embodiment, the apparatus further performs receiving and distributing a yaw prediction for future delta torques from a user interface such as a gps or map or heads-up display or goggles.

In an embodiment, the system has a filter for noise and high frequency clutter, one of a digital signal processor, a hardware discrete cosine transform (DCT), and a software algorithm.

Another aspect of the invention is a system for electric propulsion vehicle control, which has a wheel rotation sensor; a vehicle direction and speed sensor; a road surface sensor; at least four poly-phase electric motor controllers, each poly-phase electric motor controller coupled to a poly-phase electric propulsion motor; an operator control interface which measures and transmits desired vehicle acceleration and desired vehicle yaw; a torque budgeting apparatus; and a network communicatively coupling the above components.

Another aspect of the invention is a torque budgeting apparatus to control independently powered electric drive wheels which includes: a torque budget transformation circuit; an interface to a network to transmit and receive desired and attainable torque assignments; a circuit to receive measured desired vehicle acceleration and desired vehicle yaw; a circuit to receive measured wheel rotation and orientation; and a circuit to receive measured vehicle yaw and measured surface speed.

In an embodiment, the apparatus also has a circuit to measure wheel spin/skid relative to a surface.

In an embodiment, the apparatus also has a circuit to receive from each motor controller an attainable torque.

In an embodiment, the apparatus also has a circuit to compare vehicle speed with thresholds.

In an embodiment, the apparatus also has a circuit to compare wheel angle with a threshold.

In an embodiment, the apparatus also has a circuit to compare desired and measured vehicle yaw with a threshold.

In an embodiment, the apparatus also has a non-transitory selectable driver/vehicle personalization store.

In an embodiment, the apparatus also has a circuit to measure wind, humidity, temperature, and proximity to another vehicle.

In an embodiment, the apparatus also has a circuit to measure stability, road surface, lateral acceleration, wheel loading, pitch, and roll.

In an embodiment, the torque budget transformation circuit determines a spin/skid condition by comparison of wheel speed with surface speed whereupon torque assignment is caused to be reduced or reassigned until all wheels regain traction or wheel speed is within a few percent (e.g. single digit) of surface speed.

In an embodiment, the torque budget transformation circuit determines a condition when attainable torque at a wheel is substantially below assigned torque, causing a torque budget to be reassigned among electrically powered drive wheels.

In an embodiment, the torque budget transformation circuit reads a selected driver/vehicle personalization profile store to alter acceleration/deceleration and steering response to operator controls whereby a driver's ability can be met or trained for a different vehicle dynamic.

In an embodiment, the torque budget transformation circuit determines a condition when operator desired yaw is greater than measured vehicle yaw, causing delta negative torque increment to be assigned to an inside rear wheel and delta positive torque increment to be assigned to an outside rear wheel.

In an embodiment, the torque budget transformation circuit determines a condition when operator desired yaw is greater than a yaw threshold and when vehicle speed is greater than a fast threshold, causing negative torque to be assigned to all wheels on the inside of a turn and positive torque to be assigned to all wheels on the outside of a turn.

In an embodiment, the torque budget transformation circuit determines a condition of inclement weather, causing negative torque to be assigned to all wheels on the inside of a turn and positive torque to be assigned to all wheels on the outside of a turn.

In an embodiment, the torque budget transformation circuit determines a condition of poor road conditions, causing negative torque to be assigned to all wheels on the inside of a turn and positive torque to be assigned to all wheels on the outside of a turn.

In an embodiment, the torque budget transformation circuit on a condition when wheel angle is below a turning threshold and vehicle speed is substantially constant, assigns torque only to one pair of wheels on the same axle.

In an embodiment, the torque budget transformation circuit on a condition of vehicle speed below a slow threshold and a wheel angle greater than a turning threshold which defines an arc, assigns torque solely to a single wheel which is a larger radius from a center of the arc.

Another aspect of the invention is a method for operation of a torque budgeting and torque assignment apparatus for electric propulsion control comprising executable instructions stored in a non-transitory medium, the method comprising: receiving from a user control interface a desired vehicle acceleration and a desired yaw; receiving from a wheel sensor a measured wheel rotation rate; receiving from road surface sensor actual vehicle direction and speed; receiving from a road surface sensor, road condition; receiving from a motor controller, attainable torque; on a condition that attainable torque is less than assigned torque for a first wheel, reassigning a torque budget among the non-first wheels; determining acceleration/deceleration and steering response according to a selection of stored driver/vehicle personalization profiles; determining positive or negative delta torque for each powered drive wheel when measured vehicle yaw does not equal desired vehicle yaw; on the condition of aggressive cornering applying yaw controlled power to budget torque among at least four wheels; on the condition of inclement weather applying yaw controlled power to budget torque among at least four wheels; on the condition of poor road conditions applying yaw controlled power to budget torque among at least four wheels; on the condition of speed above a threshold and when not turning, distributing power to wheels associated with only one axle; on the condition of speed below a threshold, distributing power to one or more wheels associated with only one axle and if turning to only one wheel of the only one axle; on the condition of sped below a slow threshold and a wheel angle greater than a turning threshold which defines an arc, assigning torque to a single wheel which is a larger radius from a center of the arc; transmitting, to at least one electric motor controller via a network, at least one of a target torque, and a target magnitude and associated target angular measure; wherein the target magnitude is one of an amplitude for an electrical current and an amplitude for a voltage, and, the target angular measure is one of a frequency and a phase angle.

It can be appreciated that the circuits may be implemented by processors using real time customized software closely coupled to physical measurements and resulting torque assignments in Newton meters transmitted to each motor controller. The physical manifestation of the invention is electric current magnitude or voltage magnitude and a poly-phase frequency or phase angle provided to a motor. Because of the dynamic nature of controlling a vehicle, the transformation method cannot be performed mentally or using manual computations.

Referring now to the figures, FIG. 1 is a system diagram that illustrates one embodiment of an electric propulsion vehicle control 100 that includes: an operator control interface 110, a plurality of sensors 120 to measure physical parameters, a torque budgeting apparatus 300, poly-phase motor controllers 410-440, poly-phase electric propulsion motors, 510-540, all communicatively coupled by a network 600.

Figure 2:
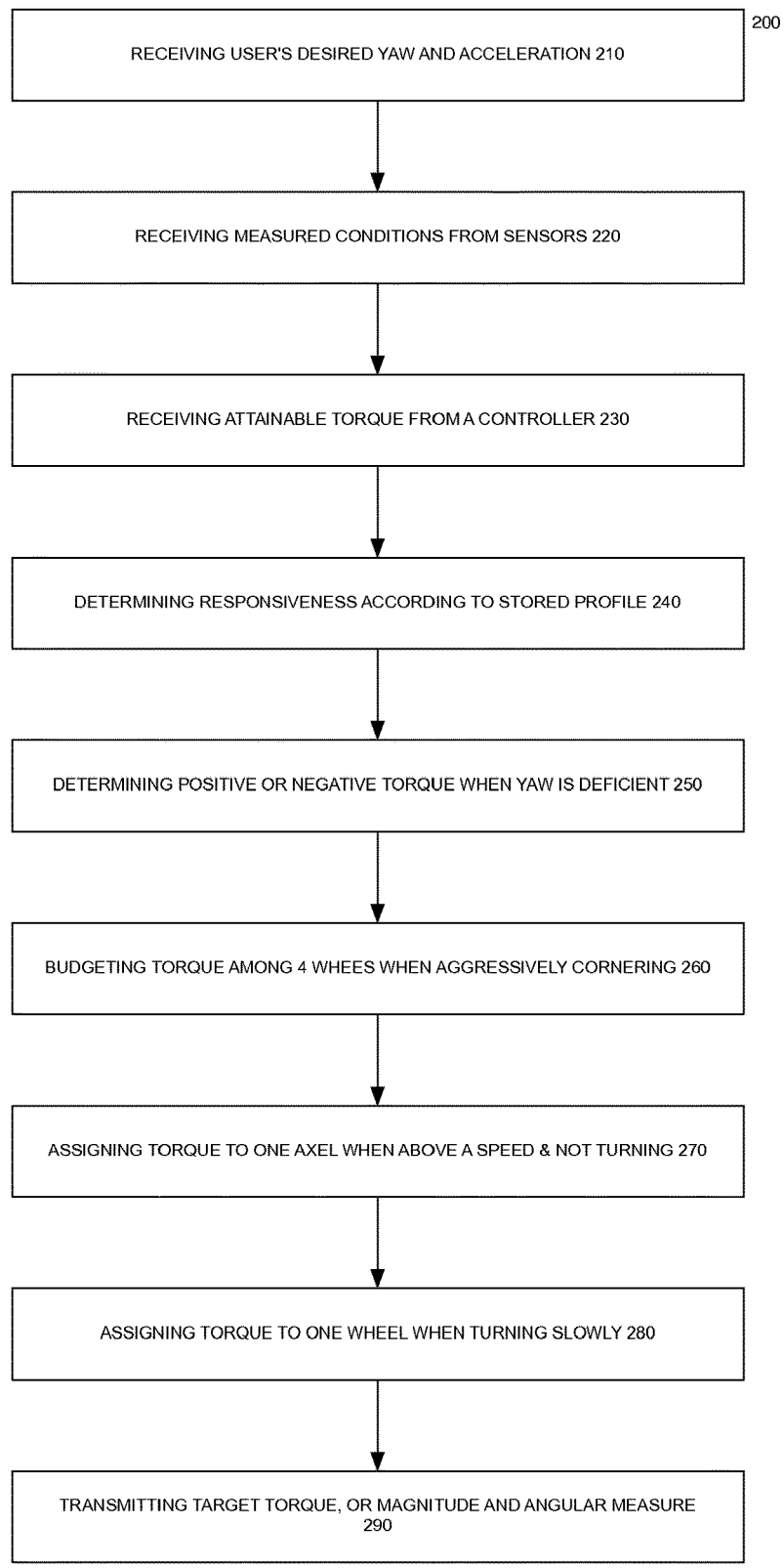
FIG. 2 is a flowchart of processes in a method of operation of the components of apparatuses of the system.

FIG. 2 is a method 200 for operation of a torque budgeting and torque assignment apparatus for electric propulsion control comprising the following processes: 210 receiving from a user control interface a desired vehicle acceleration and a desired yaw; 220 receiving measurements from sensors such as, from a wheel sensor a measured wheel rotation rate, from road surface sensor actual vehicle direction and speed; from a road surface sensor, road condition; 230 receiving from a motor controller, attainable torque, and on a condition that attainable torque is less than assigned torque for a first wheel, reassigning a torque budget among the non-first wheels; 240 determining acceleration/deceleration and steering response according to a selection of stored driver/vehicle personalization profiles; 250 determining positive or negative delta torque for each powered drive wheel when measured vehicle yaw does not equal desired vehicle yaw; 260 on the condition of aggressive cornering applying yaw controlled power to budget torque among at least four wheels, or on the condition of inclement weather applying yaw controlled power to budget torque among at least four wheels, or on the condition of poor road conditions applying yaw controlled power to budget torque among at least four wheels; 270 on the condition of speed above a threshold and when not turning, distributing power to wheels associated with only one axle or on the condition of speed below a threshold, distributing power to one or more wheels associated with only one axle and if turning to only one wheel of the only one axle; 280 on the condition of sped below a slow threshold and a wheel angle greater than a turning threshold which defines an arc, assigning torque to a single wheel which is a larger radius from a center of the arc; and, transmitting 290, to at least one electric motor controller via a network, at least one of a target torque, and a target magnitude and associated target angular measure; wherein the target magnitude is one of an amplitude for an electrical current and an amplitude for a voltage, and, the target angular measure is one of a frequency and a phase angle.

Figure 3:
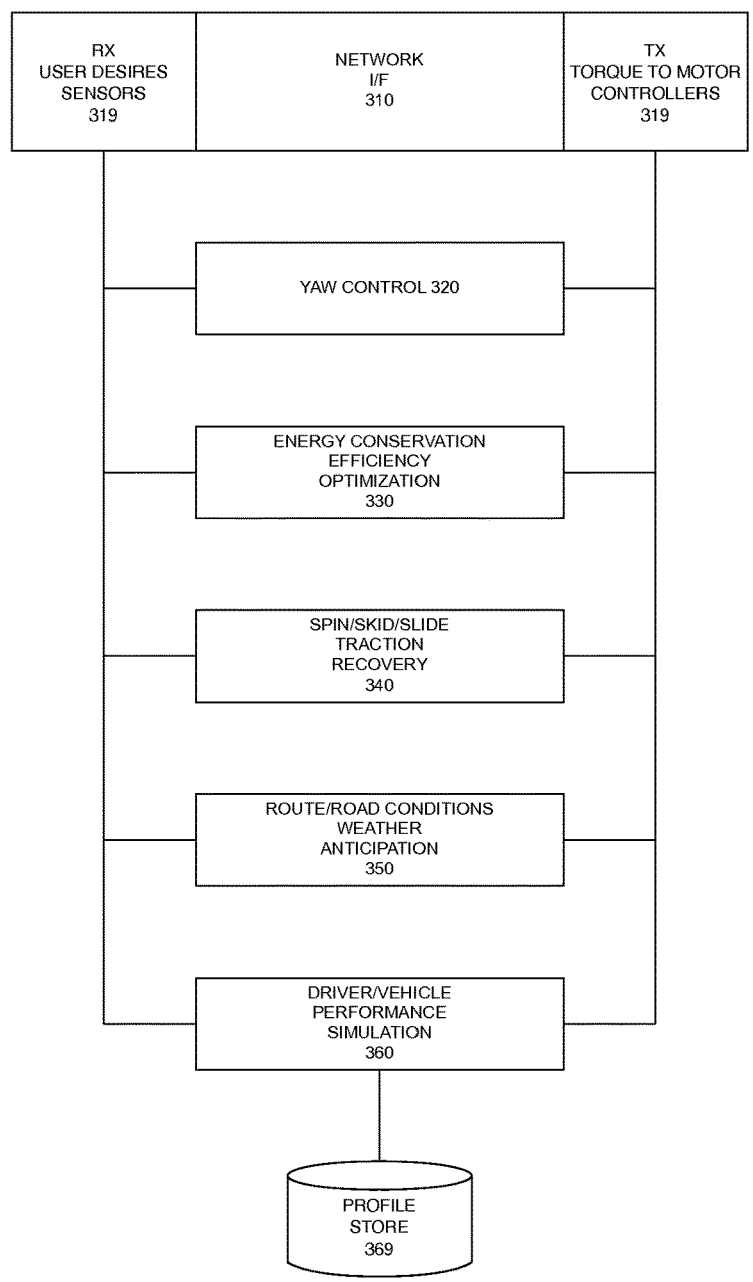
FIG. 3 is a block diagram of components of an apparatus.

Referring now to FIG. 3, a torque budgeting apparatus to control independently powered electric drive wheels includes: a network interface 310, having a receiver 311 coupled to sensors and to an operator control interface and a transmitter 319 to provide torque commands to motor control circuits; a yaw control circuit 320; an energy conservation and efficiency optimization circuit 330; a spin/skid/slide traction recovery circuit 340; a route/road condition/weather anticipation circuit 350; and a driver/vehicle simulation circuit 360, coupled to a driver/vehicle personalization profile store 369.

The network interface 310 transmits and receives desired and attainable torque assignments, receives measured desired vehicle acceleration and desired vehicle yaw, receives measured wheel rotation and orientation, and measured vehicle yaw and measure surface speed.

The yaw control circuit 320 compares desired and measured vehicle yaw with a threshold, determines a condition when operator desired yaw is greater than a yaw threshold and when vehicle speed is greater than a fast threshold, causing negative torque to be assigned to all wheels on the inside of a turn and positive torque to be assigned to all wheels on the outside of a turn; determines a condition of inclement weather, causing negative torque to be assigned to all wheels on the inside of a turn and positive torque to be assigned to all wheels on the outside of a turn.

The energy conservation efficiency optimization circuit 330 on a condition when wheel angle is below a turning threshold and vehicle speed is substantially constant, assigns torque only one pair of wheels on the same axle, on a condition of vehicle speed below a slow threshold and a wheel angle greater than a turning threshold which defines an arc, assigns torque solely to a single wheel which is a larger radius from a center of the arc.

The spin/skid/slide traction recovery circuit 340 determines a spin/skid condition by comparison of wheel speed with surface speed whereupon torque assignment is caused to be reduced or reassigned until all wheels regain traction or wheel speed is within a few percent of surface speed, determines a condition of poor road conditions, causing negative torque to be assigned to all wheels on the inside of a turn and positive torque to be assigned to all wheels on the outside of a turn.

The route/road condition/weather anticipation circuit 350 measures wind, humidity, temperature, and proximity to another vehicle, when attainable torque at a wheel is substantially below assigned torque, causing a torque budget to be reassigned among electrically powered drive wheels.

The driver/vehicle simulation circuit 360 reads a selected driver/vehicle personalization profile store to alter acceleration/deceleration and steering response to operator controls whereby a driver's ability can be met or trained for a different vehicle dynamic.

It is understood that circuits described above can be implemented as digital logic gates in a mask programmed standard cell or gate array. The circuits may equally be embodied in a programmable logic device depending on fuses or electrically erasable flash memory or firmware. The circuits may equally be embodied in Field Programmable Gate Arrays configured by non-transitory storage such as flash or read only memories (ROM). The circuits above may equally be embodied as processors adapted by instructions in non-transitory storage to perform the specific logic functions.

CONCLUSION

The subject matter is easily distinguished as a real time control system with feedback from measurements of a vehicle's dynamic response to voltage or current magnitudes and frequency or phase commands individually assigned to each motor controller. Although processors are utilized to perform calculations continuously as the operator steers, accelerates, and decelerates, the invention is comparable to mechanical differentials which are patentable subject matter.

The claimed subject matter is easily distinguished from conventional torque vectoring apparatus by receiving feedback from each adaptive field-oriented motor control what is attainable torque and amending the torque budget to each wheel. In a conventional system a central engine throttle and one or more hydraulic brake pistons is engaged to modify vehicle yaw torque. Electrically controlled wheels offer more dynamic positive and negative torque with far fewer mechanical linkages. Sensors locally attached to each wheel can provide slip and skid information directly to an adaptive field-oriented control (AF-OC) circuit. Each AF-OC circuit determines what its attainable torque can be for current conditions and transmits it to a torque budgeting circuit. The torque budgeting circuit can readjust its target torque commands in consideration of attainable torque for each wheel, user operations (steering), and lateral acceleration and stability data.

The techniques described herein can be implemented in digital electronic circuitry, or in computer hardware, firmware, software, or in combinations of them. The techniques can be implemented as an embedded microcontroller, i.e., firmware tangibly embodied in a non-transitory medium, e.g., in a machine-readable storage device, for execution by, or to control the operation of circuit apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and connected by a wireless network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. A method for operation of a torque budgeting and torque assignment apparatus for electric propulsion control comprising executable instructions stored in a non-transitory medium, the method comprising:
    receiving from a user control interface a desired vehicle yaw;
    receiving from a wheel sensor a measured wheel rotation rate;
    receiving from road surface sensor actual vehicle direction and speed;
    receiving from a road surface sensor, road condition;
    receiving from a motor controller, attainable torque;
    on a condition that attainable torque is less than assigned torque for a first wheel, reassigning a torque budget among the non-first wheels;
    determining as a steering response, positive delta torque to be assigned to all wheels on the outside of a turn and negative delta torque to be assigned to all wheels on the inside of a turn according to a selection of stored parameterized profiles of vehicle characteristics and driver skill level which control a torque budgeting circuit for desired vehicle yaw turning moment;
    determining positive or negative delta torque for each powered drive wheel when measured vehicle yaw does not equal desired vehicle yaw; and,
    transmitting, to at least one electric motor controller via a network, at least one of a target torque, and a target magnitude and associated target angular measure; wherein the target magnitude is one of an amplitude for an electrical current and an amplitude for a voltage, and, the target angular measure is one of a frequency and a phase angle.

2. The method of claim 1, further comprising:
    on the condition of aggressive cornering, applying yaw controlled power to budget torque among at least four wheels;
    on the condition of inclement weather, applying yaw controlled power to budget torque among at least for wheels;
    on the condition of poor road conditions, applying yaw controlled power to budget torque among at least four wheels;
    on the condition of speed above a threshold and when not turning, distributing power to wheels associated with only one axle;
    on the condition of speed above the threshold, and when not turning, distributing power to wheels associated with only one axle;
    on the condition of speed below a threshold, distributing power to one or more wheels associated with only one axle and if turning, to only one wheel of the only one axle;
    on the condition of speed below a slow threshold and a wheel angle greater than a turning threshold which defines an arc, assigning torque to a single wheel which is a larger radius from a center of the arc; and
    transmitting, to at least one electric motor controller via network, at least one of a target torque, and a target magnitude and associated target angular measure; wherein the target magnitude is one of an amplitude for an electrical current and an amplitude for a voltage, and, the target angular measure is one of a frequency and a phase angle.

* * * * *